E. G. HAYNE.
DEVICE FOR MILKING COWS.
APPLICATION FILED AUG. 4, 1914.
1,146,252.
Patented July 13, 1915.
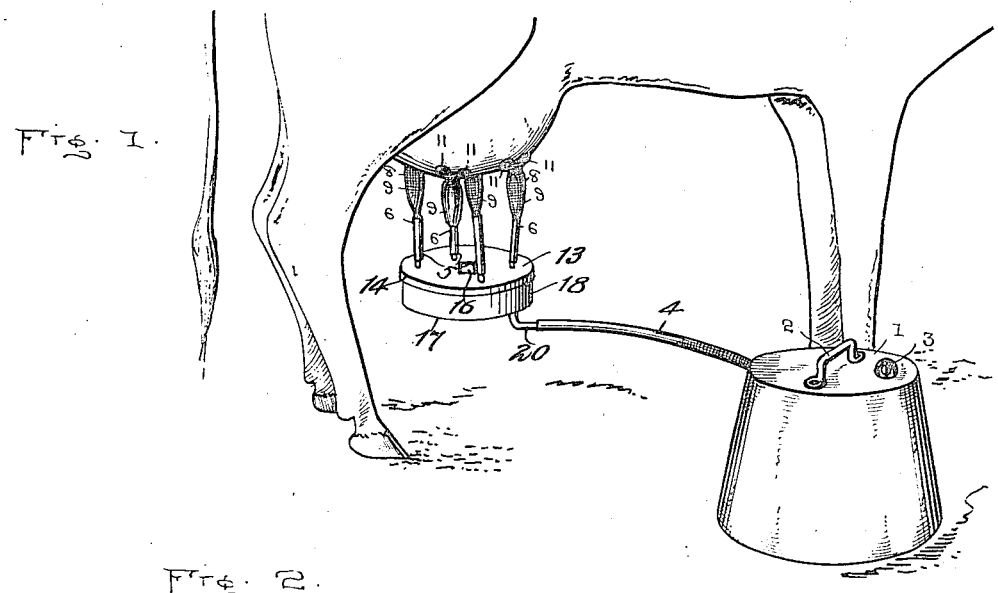
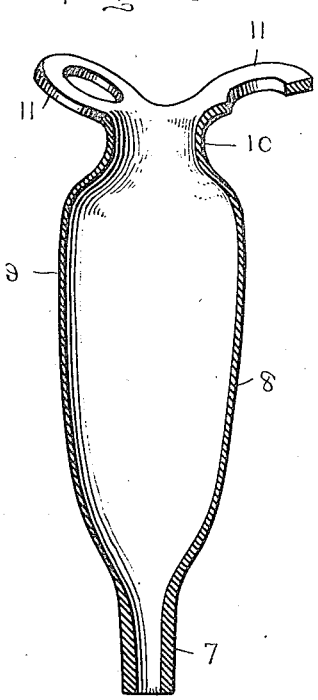
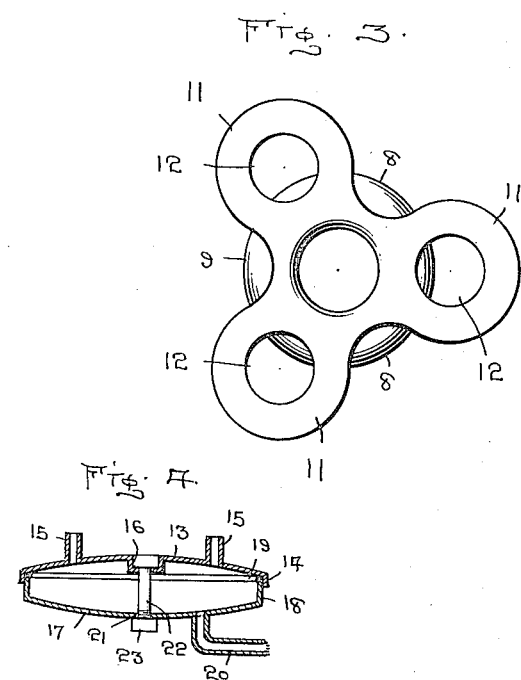
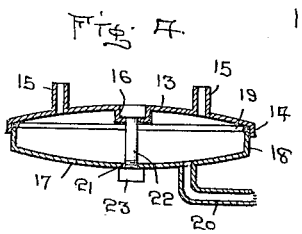
Witnesses
Thomas Reny
Edward H. Young
Inventor
E. G. Hayne
By W. J. Fitzgerald
Attorney

UNITED STATES PATENT OFFICE.

EDWARD G. HAYNE, OF OTTAWA, ILLINOIS.

DEVICE FOR MILKING COWS.

1,146,252.  Specification of Letters Patent.  Patented July 13, 1915.

Application filed August 4, 1914. Serial No. 854,973.

*To all whom it may concern:*

Be it known that I, EDWARD G. HAYNE, a citizen of the United States, residing at Ottawa, in the county of La Salle and State of Illinois, have invented certain new and useful Improvements in Devices for Milking Cows; and I do hereby declare the following to be a full, clear, and exact description of the invention, such as will enable others skilled in the art to which it appertains to make and use the same.

My invention relates to devices for milking cows, and in particular to devices whereby the process of milking can be accomplished in a perfectly wholesome and sanitary manner.

One of the objects of my invention is to provide a device whereby the cow can be manually milked in the ordinary manner in such a way that bacterial laden air is excluded from the milk.

A still further object of my invention is to provide a device whereby the teat or glove covering the teat of a cow can be rigidly attached in position by the fingers of the operator.

With these and other objects in view to be developed as the specification proceeds I shall now describe my invention in which a preferred form is shown in the drawings, but I wish it to be understood that I am not limited to the form of structure shown but claim all possible modifications which fall within the scope of the claim appended hereto.

Similar characters of reference refer to similar parts throughout the drawings, in which, Figure 1, is a perspective view of my device in assembled formation. Fig. 2, is a sectional view through the teat or glove. Fig. 3, is a plan view thereof. And Fig. 4, is a view of a modified form.

Referring to Fig. 1 of the drawings, I use an air tight receptacle 1, said receptacle having a lifting handle 2, riveted thereto, a filling opening thereto adapted to be closed against the intrusion of air after the can has been filled with milk, and a check controlled valve 3, adapted to allow the air within the can to escape as it is filled with milk, and to check the ingress of air. A suitable supply tube 4 is connected to the filling opening of the can and adapted to supply milk thereto, said supply tube 4 having a plurality of branch tubes 5 having a nozzle end 6 adapted to seat over the mouth 7 of the teat or glove 8, said teat or glove being adapted to cover the teat of the cow in such manner that air will be excluded from reaching the milk.

My teat or glove 8 is composed of an enlarged body portion 9, composed of very flexible rubber that is impervious to the passage of air thereinto or milk therefrom. At the upper portion I have a restricted neck portion 10 and obliquely flaring out from my neck portion 10 a plurality of apertured tongues 11, said tongues having a central aperture 12 therethrough of a diameter large enough to receive the ends of the finger of the operator, said tongues being of the same thickness and strength with said neck and body portion.

In the modified form shown in Fig. 4, 13 is a top plate having downturned edges 14, a plurality of projections 15, and an offset portion 16 adapted to seat the head of a bolt, while the lower plate 17 has an upturned flanged edge 18 adapted to seat within the flange 14 of the upper plate and to seal therebetween a washer 19, the plate 17 has an outlet 20 communicating with the receptacle 1. There is a central aperture 21 therethrough, through which the bolt 22 is passed to lock said plates 13 and 17 into operative position by means of the nut 23. The mouth 7 of each teat glove is mounted upon one of the projections 15 and is operated in the before described manner.

In mounting the glove upon the teat of the cow, the operator inserts two of his fingers in the apertures 12, with one hand and grasp the other tongue with the opposite hand and at the same moment stretching all tongues outwardly to open the neck portion 10 of the glove or teat. When in open position the glove is inserted to fully cover the teat when the tongues are allowed to respond to their normal position, thereby closing the restricted neck portion 10 to bind against the teat, this operation combining to retain the glove or teat upon the teat and to exclude air therefrom. The cow is then milked by hand in the usual customary manner, the milk flowing through the tubes 5 and 4 into the can 1 where it can be retained to an unusual length of time without souring owing to the fact that the air has been wholly excluded from the milk, so that the bacteria will not penetrate the milk and thereby sour it.

Having now described my invention what I claim as new and desire to secure by Letters Patent is,

A device of the character described comprising; a sealed receptacle, a supply tube communicating thereto, a union receptacle connected to said supply tube having a plurality of projections therefrom, and a teat glove mounted upon each of said projections, said union receptacle comprising, an upper plate having downturned edges, a plurality of integral projections arising therefrom, and a squared offset portion centrally disposed therein, a lower plate having upturned edges, an outlet therefrom and centrally apertured therethrough, and a bolt having a squared head snugly seated in said offset portion and passing through said aperture to mount said plates into operative position, the seating of said head preventing the turning of said bolt and the consequent loosening of said device.

In testimony whereof I have signed my name to this specification in the presence of two subscribing witnesses.

EDWARD G. HAYNE.

Witnesses:
Tom W. Smurr,
Mona Jenkinson.